US008671972B2

(12) United States Patent
Winn

(10) Patent No.: US 8,671,972 B2
(45) Date of Patent: Mar. 18, 2014

(54) SAFETY VALVE SYSTEM FOR OVERPRESSURE PROTECTION OF HYDRAULIC CIRCUITS

(76) Inventor: Mike Winn, Vernal, UT (US)

( * ) Notice: Subject to any disclaimer, the term of this patent is extended or adjusted under 35 U.S.C. 154(b) by 151 days.

(21) Appl. No.: 13/180,088

(22) Filed: Jul. 11, 2011

(65) Prior Publication Data

US 2012/0073678 A1 Mar. 29, 2012

Related U.S. Application Data

(60) Provisional application No. 61/386,364, filed on Sep. 24, 2010.

(51) Int. Cl.
*F16K 17/00* (2006.01)

(52) U.S. Cl.
USPC ............................ 137/461; 137/456; 137/485

(58) Field of Classification Search
USPC ................. 137/456, 462, 461, 492, 458, 485; 251/26
See application file for complete search history.

(56) References Cited

U.S. PATENT DOCUMENTS

| | | | | | |
|---|---|---|---|---|---|
| 1,201,426 | A | * | 10/1916 | Anderson | 137/488 |
| 2,658,521 | A | * | 11/1953 | Lyon | 137/461 |
| 3,007,480 | A | * | 11/1961 | Stalnecker | 137/102 |
| 3,146,789 | A | * | 9/1964 | Curth | 137/461 |
| 3,227,171 | A | * | 1/1966 | Woelfel | 137/87.04 |
| 3,476,017 | A | * | 11/1969 | Frisk et al. | 91/518 |
| 3,481,362 | A | * | 12/1969 | Dollison | 137/460 |
| 3,661,173 | A | * | 5/1972 | Bauer | 137/462 |
| 4,067,359 | A | * | 1/1978 | Kwast | 137/630.14 |
| 4,240,463 | A | * | 12/1980 | Moore | 137/492.5 |
| 4,304,250 | A | * | 12/1981 | Snyder | 137/102 |
| 4,457,334 | A | * | 7/1984 | Becker et al. | 137/461 |
| 5,064,169 | A | * | 11/1991 | Alberts et al. | 251/334 |
| 5,752,544 | A | * | 5/1998 | Yves | 137/461 |
| 7,913,714 | B2 | * | 3/2011 | Arov et al. | 137/456 |

OTHER PUBLICATIONS

Sun Hydraulics COHA-XCN (Applicant admitted prior art) //www.sunhydraulics.com/cmsnet/Cartridge.aspx?lang_id=1&ModelCode=COHA&CatModelID=5184 Publication date Oct. 4, 2011.*

* cited by examiner

*Primary Examiner* — Stephen M Hepperle
*Assistant Examiner* — Umashankar Venkatesan
(74) *Attorney, Agent, or Firm* — Pate Peterson PLLC; Brett Peterson

(57) ABSTRACT

An overpressure protection system provides for protection of a hydraulic system from elevated pressures. The system automatically stops flow to the system and prevents system pressure from exceeding a predetermined level. The system requires manual intervention to reopen flow, giving a worker the opportunity to resolve any system problems before system damage occurs.

19 Claims, 8 Drawing Sheets

SAFETY VALVE SYSTEM FOR OVERPRESSURE PROTECTION OF HYDRAULIC CIRCUITS

PRIORITY

The present application claims the benefit of U.S. Provisional Application Ser. No. 61/386,364, filed Sep. 24, 2010, which is herein incorporated by reference in its entirety.

THE FIELD OF THE INVENTION

The present invention relates to a system for overpressure protection. More specifically, the present invention relates to an inline relief valve which prevents damage to hydraulic equipment due to overpressure of the hydraulic circuit.

BACKGROUND

Hydraulic pressure is commonly used to power equipment such as generators, compressors, power tools, etc. Frequently, a power take off is used with a truck to provide power to hydraulic equipment. The power take off typically connects a hydraulic pump to a truck transmission. The hydraulic pump is connected to inflow and outflow lines that terminate in hydraulic quick release connectors at the back of the truck.

Problems during use of the power take off and hydraulic equipment can damage the equipment. As an example, if the return line from the equipment to the pump is not properly connected, the return line remains closed and the hydraulic equipment experiences the full output pressure of the hydraulic pump as soon as the pump is engaged. Hydraulic equipment typically contains pressure sensitive components such as hydraulic fluid coolers on the return side of the hydraulic circuit. Subjecting these components to full hydraulic pressure will cause them to burst and will spill the hydraulic fluid as quickly as the truck hydraulic pump can pump the fluid.

It is easily appreciated that it is desirable to protect the hydraulic equipment from overpressure situations in order to eliminate damage and to prevent hydraulic fluid spills.

SUMMARY OF THE INVENTION

It is an object of the present invention to provide an improved system for overpressure protection of hydraulic circuits such as hydraulic compressors, generators, or tools used with a truck power take off.

According to one aspect of the invention, a compact overpressure protection valve is provided which closes the high pressure inflow line of a hydraulic circuit if pressure becomes too high in the low pressure side of the circuit.

According to another aspect of the invention, a relief valve and catch tank is connected to the low pressure side of the system and to the overpressure protection valve to protect the low pressure components from high pressures.

These and other aspects of the present invention are realized in an overpressure protection system as shown and described in the following figures and related description.

BRIEF DESCRIPTION OF THE DRAWINGS

Various embodiments of the present invention are shown and described in reference to the numbered drawings wherein.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single FIGURE, and as such, multiple figures are presented to separately illustrate the various details of the invention in greater clarity. Similarly, not every embodiment need accomplish all advantages of the present invention.

DETAILED DESCRIPTION

The invention and accompanying drawings will now be discussed in reference to the numerals provided therein so as to enable one skilled in the art to practice the present invention. The drawings and descriptions are exemplary of various aspects of the invention and are not intended to narrow the scope of the appended claims.

Figure 1:
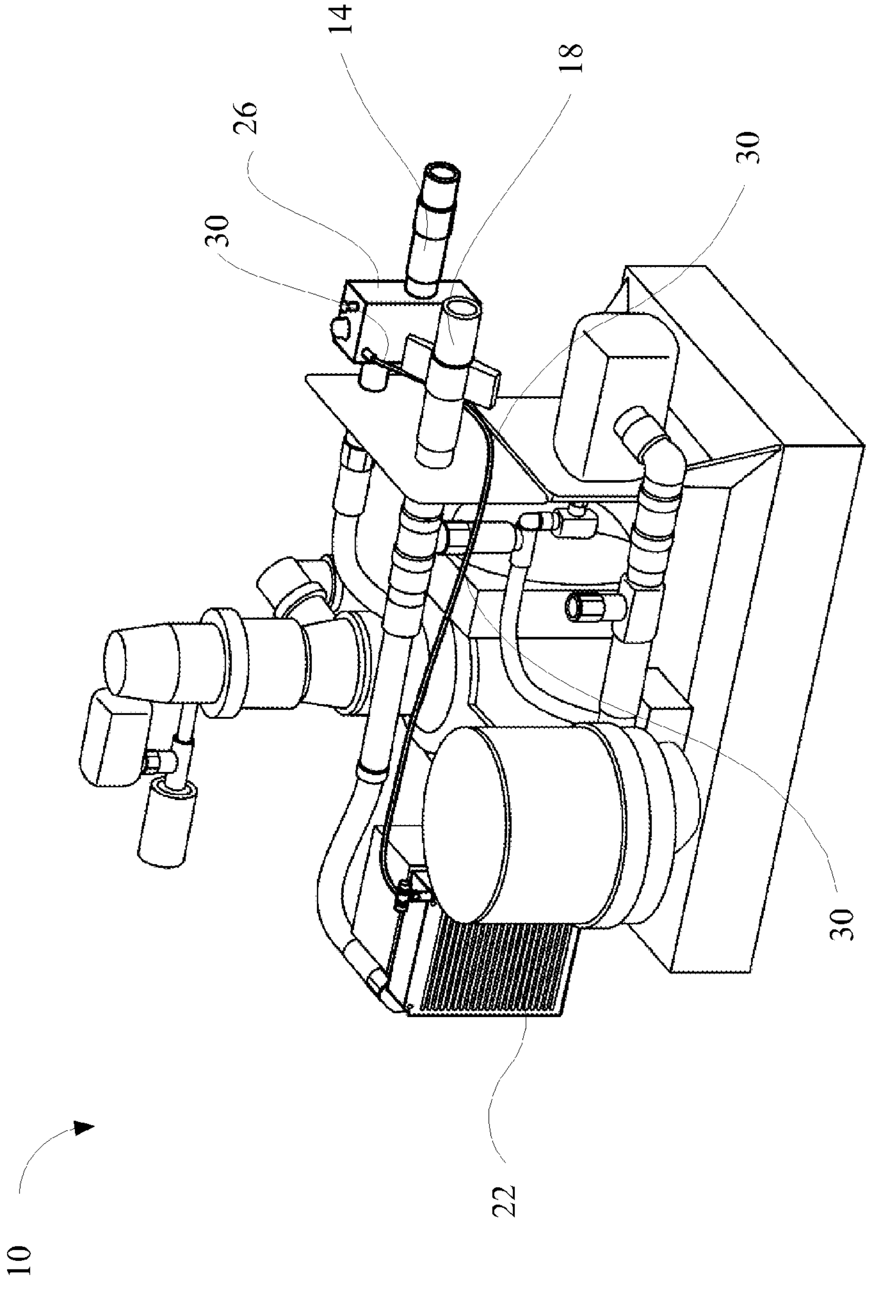
FIG. 1 shows a perspective view of a hydraulic system 10 incorporating the overpressure protection system of the present invention.

Turning now to FIG. 1, a perspective view of a hydraulically driven compressor using the overpressure protection device of the present invention is shown. Although a compressor is used as an exemplary device, the overpressure protection device may be used with many other types of hydraulic devices as well. The compressor, indicated generally at 10, includes a hydraulic feed line 14 and return line 18. The feed line 14 and return line 18 are connected to a hydraulic pump, such as a power take off of a vehicle. Hydraulic fluid passes from the power take off, through the feed line, through the compressor (or other hydraulically driven tool being used) and through the return line and back to the power take off. Before hydraulic fluid returns to the hydraulic pump through the hydraulic return line 18, it passes through a fluid cooler 22. The fluid cooler 22 is similar to a radiator, and cannot handle the full output pressure of the power take off pump. Problems occur when a return line is blocked or becomes clogged, pinched closed, or is not connected, for example. This causes the return line pressure to quickly rise to the full output pressure of the power take off pump, and causes the cooler 22 to burst, spilling hydraulic fluid.

In order to prevent damage to the hydraulic system, an overpressure prevention valve assembly 26 of the present invention is attached to the high pressure inlet line 14. The overpressure prevention valve 26 shuts off flow through the inlet line 14 if the pressure in a monitored low pressure line (a desired point in the system for protection from overpressure) exceeds a predetermined threshold pressure. A low pressure sense line 30 connects the overpressure protection valve 26 to the desired point of pressure protection in the system.

Figure 2:
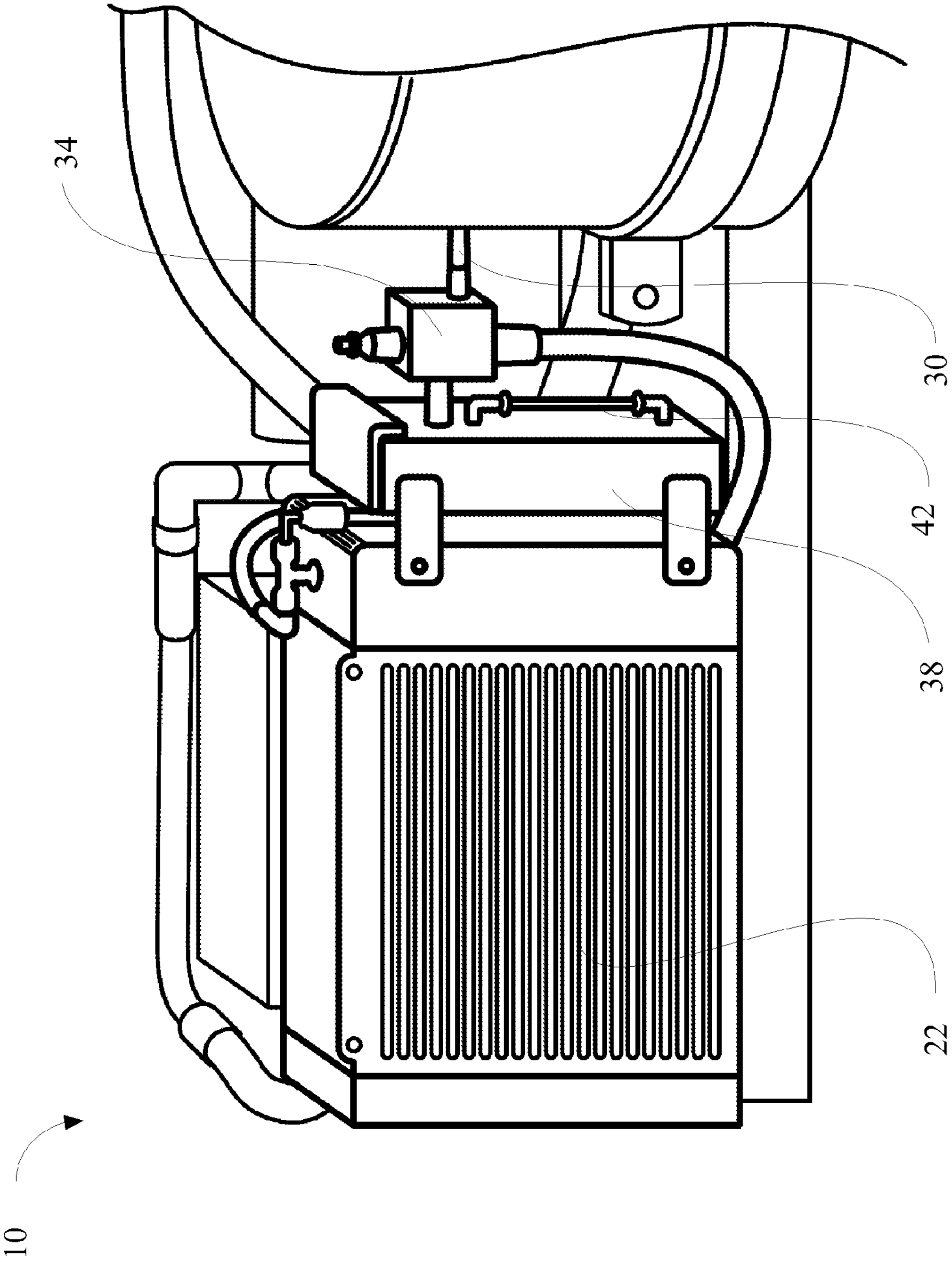
FIG. 2 shows a perspective view of a part of the system of FIG. 1.

FIG. 2 shows a partial perspective view of the back of the compressor 10. A pressure relief valve 34 and overflow tank 38 of the present invention are provided to protect the cooler 22 from overpressure situations where return flow to the power take off is impeded or prevented and a pressure spike can not exit the system. The overflow tank 38 may be provided with a sight glass 42 or the like to allow a person to see the level of hydraulic fluid in the tank.

If the return line 18 become blocked or restricted, such as where the line is crushed or a worker simply forgets to connect the return line 18 to the power take off system, the return line system demands. When the power take off is engaged, the pressure in the hydraulic system 10 will rise, often very rapidly. As soon as the pressure in the low pressure return side of the system 10 exceeds a selected pressure (often about 250 psi), the overpressure protection valve 26 closes flow from the power take off and, if necessary, the pressure relief valve 34 vents any remaining pressure in the low pressure side of the system 10 into the tank 38. In order to restart the system, a person must usually manually relieve residual pressure in internal passages of the overpressure protection valve 26. This prevents the power take off system from again providing pressure to the hydraulic system 10 before any issue is resolved, and reminds the worker to correct any problem in the system 10 before use.

Figure 3:
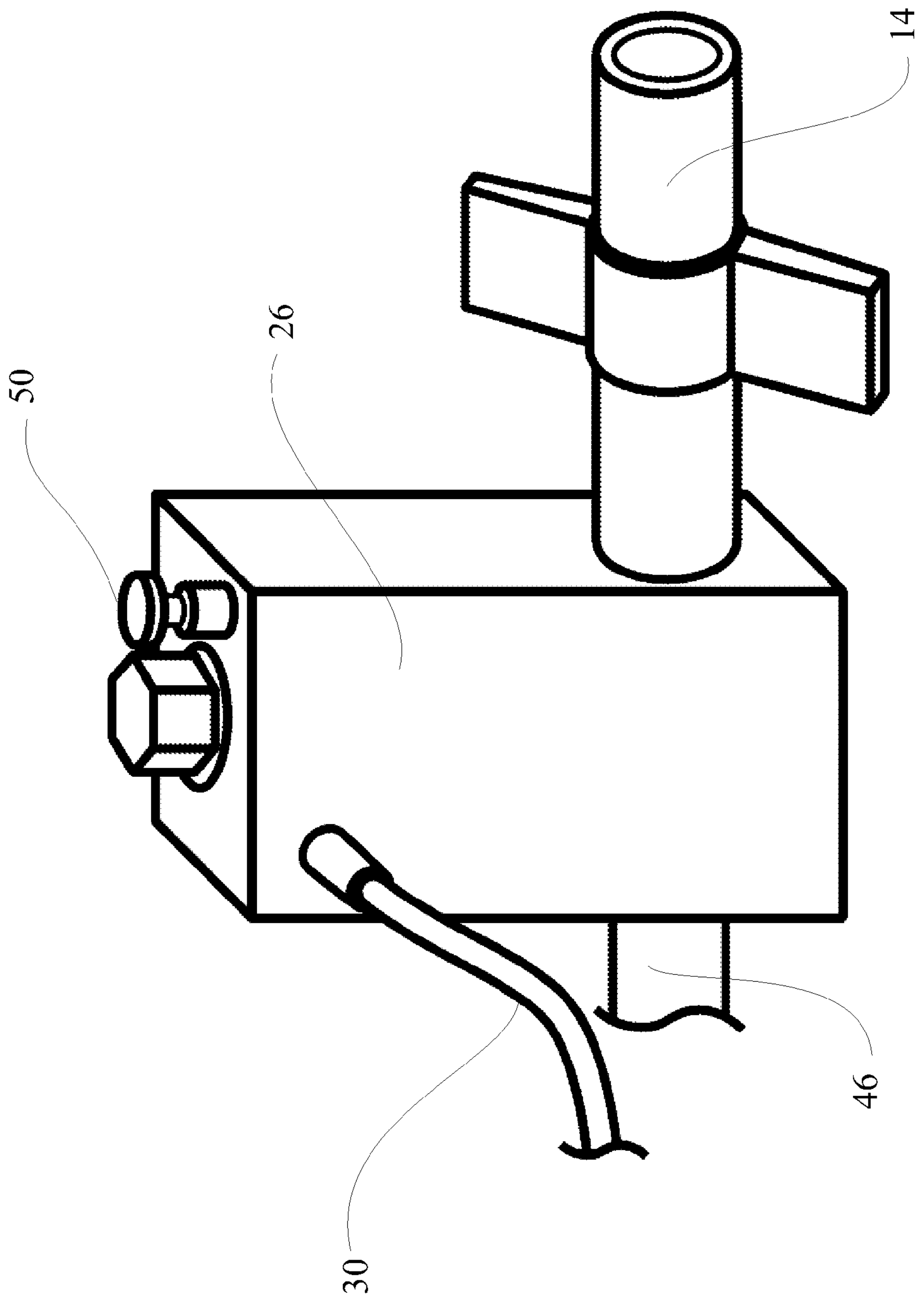
FIG. 3 shows a perspective view of the overpressure protection valve of FIG. 1.

FIG. 3 shows a perspective view of the overpressure protection valve 26. The overpressure protection valve 26 is connected to the high pressure hydraulic inlet 14 and a high pressure hydraulic outlet 46 which transmits the hydraulic fluid to the hydraulic system 10. The overpressure protection valve 26 is also connected to the pressure sense line 30 and includes a valve handle 50 typically part of a manually operated poppet valve 74 to relieve pressure within the internal passages of the valve 26 as will be discussed below.

Figure 4:
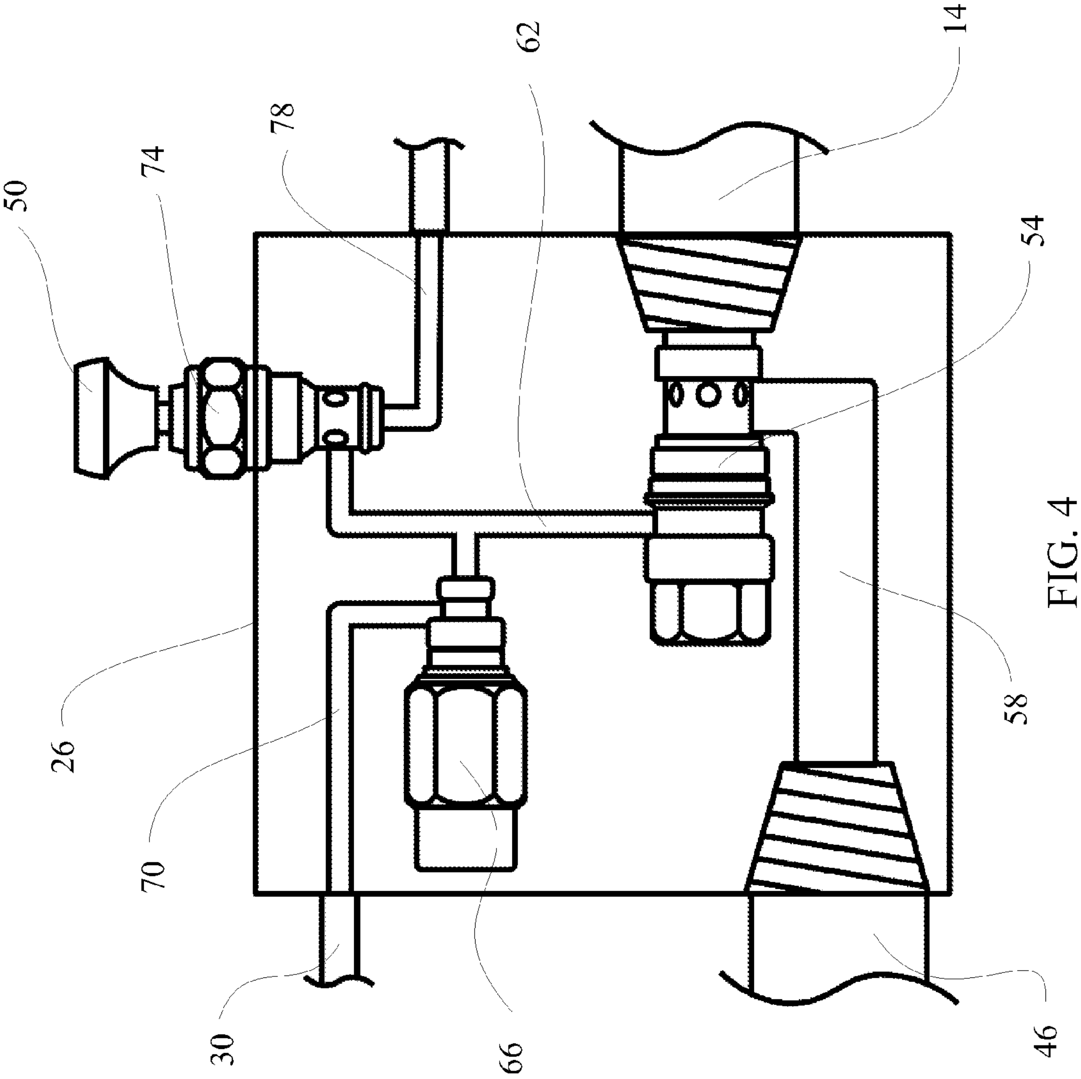
FIG. 4 shows a schematic view of the overpressure protection valve of FIG. 1.

FIG. 4 shows a schematic diagram of the internal components and passages of the overpressure protection valve 26. The valve 26 uses a pilot-to-close check valve cartridge 54 such as a Sun Hydraulics COHA-XCN cartridge to connect the high pressure inlet 14 to the high pressure system line 46. Hydraulic fluid flows through the inlet 14, through the cartridge 54, through internal passage 58, and through hydraulic line 46 and to the hydraulic device 10 (i.e. the compressor or other machine operated by the pumped hydraulic fluid). The pilot-to-close valve cartridge 54 prevents back flow, and closes off flow when pressure in a pilot line 62 exceeds a predetermined pressure. A hydraulically-operated pilot valve cartridge 66, such as a Sun Hydraulics DAAH-CAN valve cartridge, is connected to pressure sense line 30 through internal passage 70.

The sense line is a hydraulic line connecting the overpressure protection valve to a low pressure part of the hydraulic device 10 (such as to the hydraulic fluid cooler or another pressure sensitive component). When hydraulic pressure in the sense line 30 exceeds a predetermined threshold the pilot valve 66 opens and allows pressure to flow through the pilot line 62 and to the pilot inlet of the check valve 54, closing the check valve 54. Since overpressure in the system 10 is often caused by the failure to connect the return line 18 or by a clogged return line, closing the check valve 54 prevents a further rise in the system pressure, but does not relieve the system pressure. As such, the sense line 30 (and the hydraulic fluid within the protected device 10) remains at the pressure threshold which operates the protection valve and the check valve 54 remains closed. A manually operated poppet valve 74 is provided to allow a worker to relieve pressure in passage 62 via exit passage 78. The vented hydraulic fluid may be contained in an overflow tank, or may simply be vented to the ground as it will typically be a negligible amount of fluid. Opening the relief valve 74 will lower the pressure in the pilot inlet of the check valve 54 and allow fluid to again flow through the check valve 54 and to the hydraulic device 10.

Figure 8:
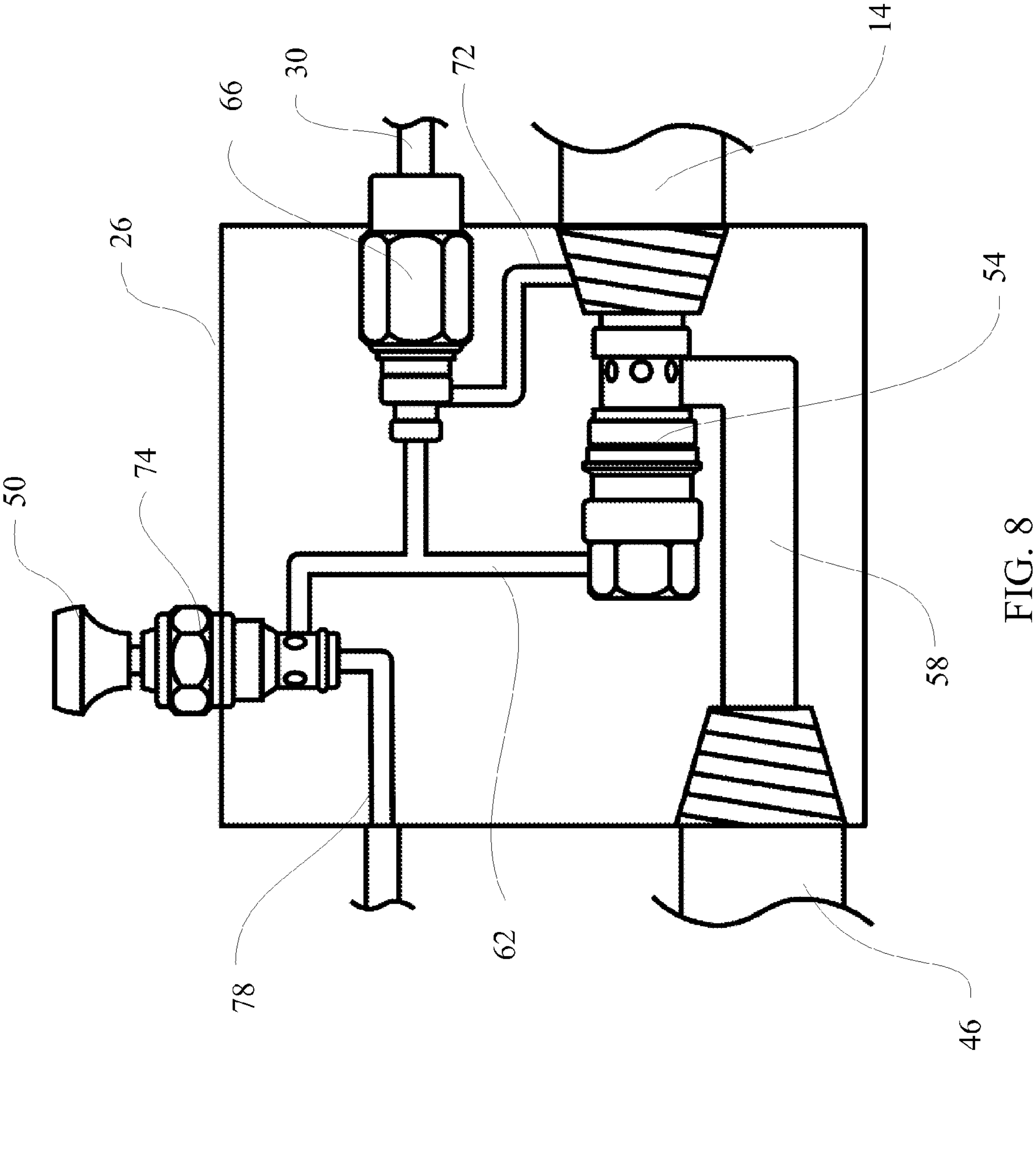
FIG. 8 shows an alternate schematic view of the overpressure protection valve of FIG. 1.

FIG. 8 shows a schematic diagram of the internal components and passages of an alternate configuration of the overpressure protection valve 26. Similar to the configuration shown in FIG. 4, the valve 26 uses a pilot-to-close check valve cartridge 54 to connect the high pressure inlet 14 to the high pressure system line 46 via internal passage 58. The pilot-to-close valve cartridge 54 prevents back flow, and closes off flow when pressure in a sense line 30 exceeds a predetermined pressure. A hydraulically-operated pilot valve cartridge 66 is connected to pressure sense line 30. The sense line 30 is a hydraulic line connecting the overpressure protection valve to a low pressure part of the hydraulic device 10 (such as to the hydraulic fluid cooler or another pressure sensitive component). When hydraulic pressure in the sense line 30 exceeds a predetermined threshold the pilot valve 66 opens and allows pressure to flow through an internal pressure passage 72, through the pilot valve 66, through an internal pilot line 62 and to the pilot inlet of the check valve 54, closing the check valve 54. The internal pressure passage 72 is connected to the high pressure inlet 14 and the pilot valve 66 as shown.

Since overpressure in the system 10 is often caused by the failure to connect the return line 18 or by a clogged return line, closing the check valve 54 prevents a further rise in the system pressure, but does not relieve the system pressure. As such, the sense line 30 (and the hydraulic fluid within the protected device 10) remains at the pressure threshold which operates the protection valve and the check valve 54 remains closed. A manually operated valve 74 such as a poppet valve is provided to allow a worker to relieve pressure in passage 62 via exit passage 78. The vented hydraulic fluid may be contained in an overflow tank, or may simply be vented to the ground as it will typically be a negligible amount of fluid. Opening the relief valve 74 will lower the pressure in the pilot inlet of the check valve 54 and allow fluid to again flow through the check valve 54 and to the hydraulic device 10.

Figure 5:
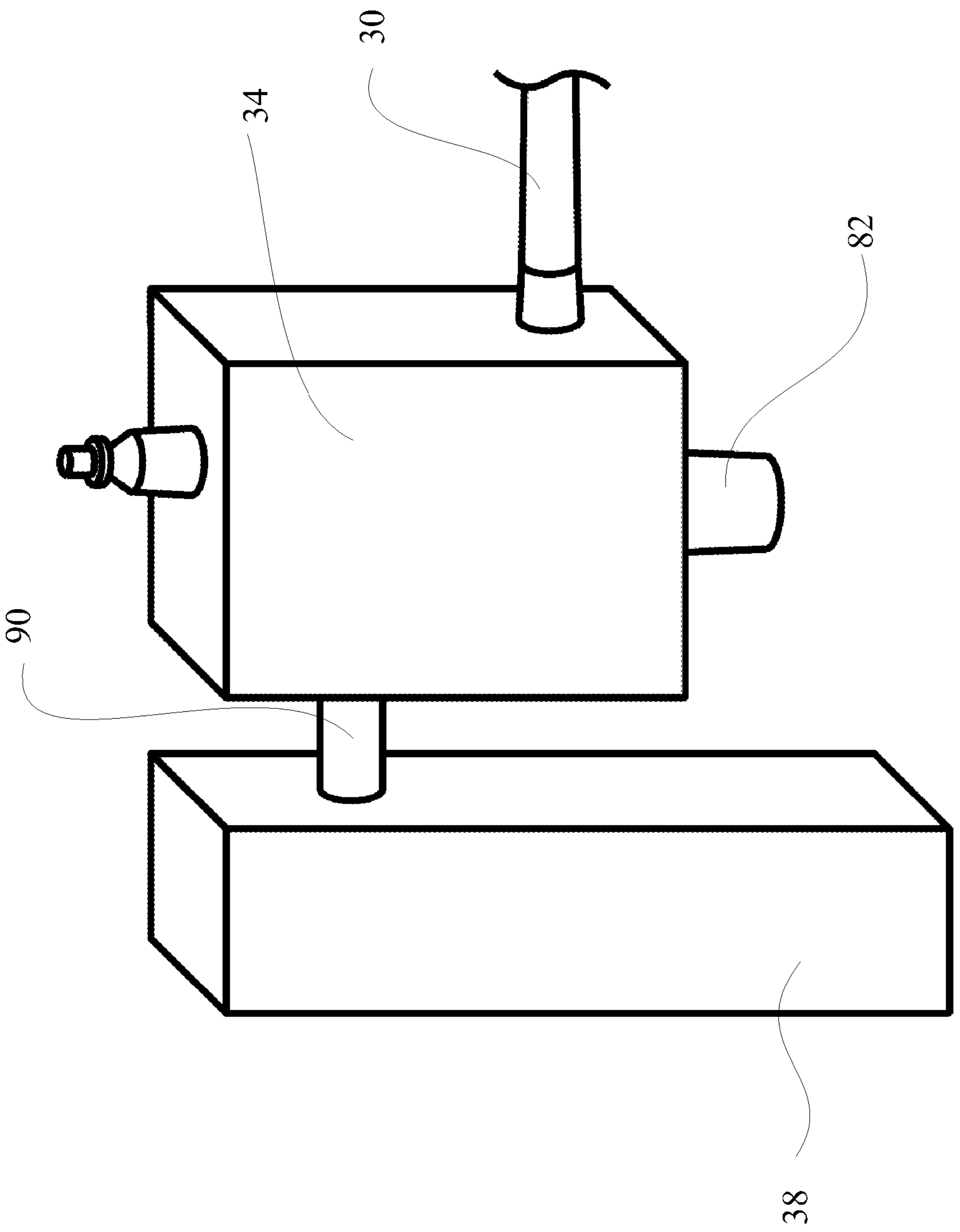
FIG. 5 shows a perspective view of the pressure relief valve of FIG. 1.

FIG. 5 shows a perspective view of the pressure relief valve 34 and overflow tank 38. The pressure relief valve 34 is connected to a part of the hydraulic device 10 where pressure is to be monitored and overpressure prevented. This is typically a low pressure part of the system. A low pressure line 82 is connected to that part of the system, and the pressure relief valve 34 may be used to connect the sense line 30 to the low pressure line 82. Alternatively, the sense line 30 may be separately connected to the part of the device 10 being monitored.

Figure 6:
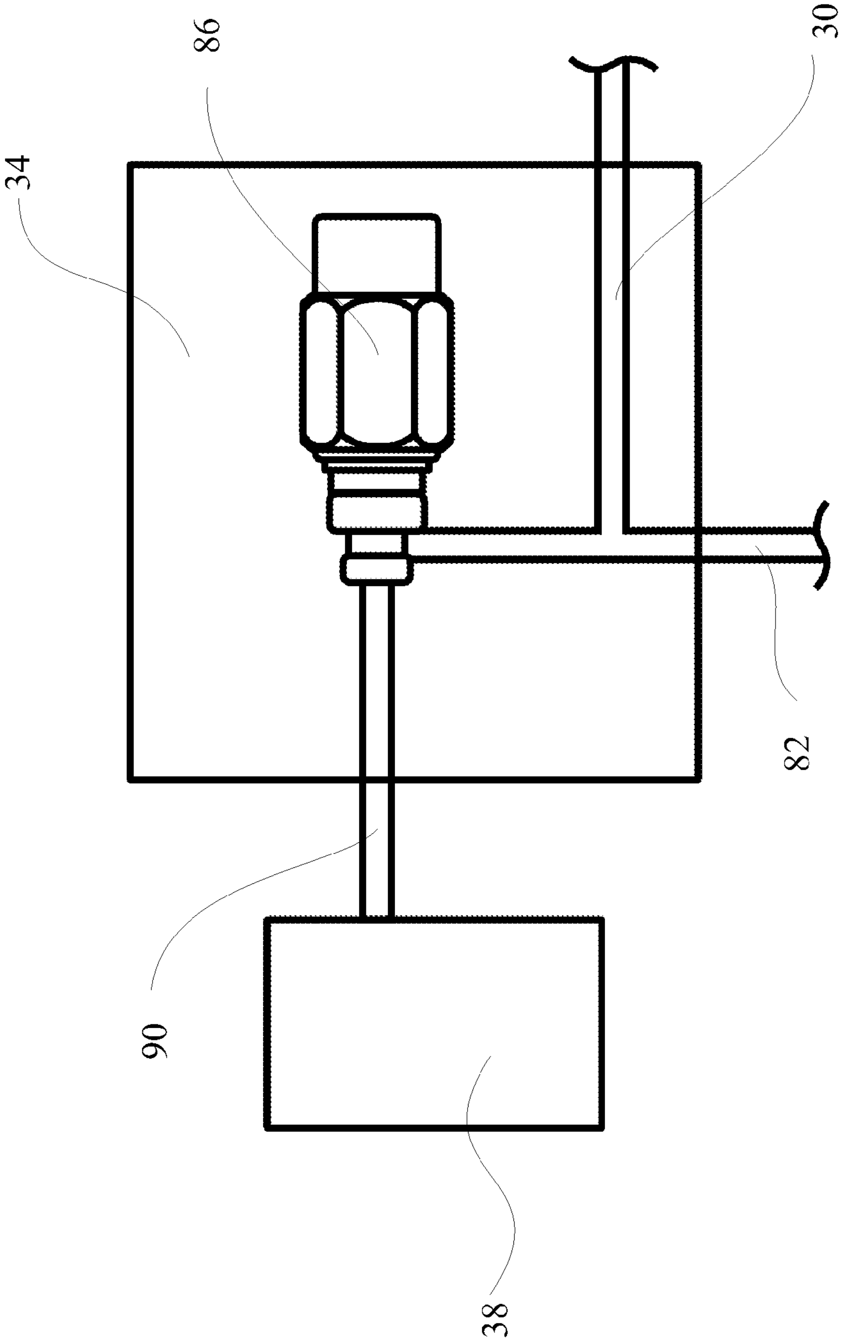
FIG. 6 shows a schematic view of the pressure relief valve of FIG. 1.

FIG. 6 shows a schematic diagram of the pressure relief valve 34. The valve uses a hydraulically-operated pilot valve 86 to allow flow from the system low pressure line 82 into the tank 38 via passage/line 90. The pilot valve 86 may be selected to open at the same or a slightly higher pressure than the pilot valve 66. The pilot valve 86 should not open at a lower pressure than pilot valve 66 as this would allow fluid to be vented into the overflow tank 38 (and likely overfilling the tank 38) without shutting off flow to the system 10 at the overpressure protection valve 26.

Figure 7:
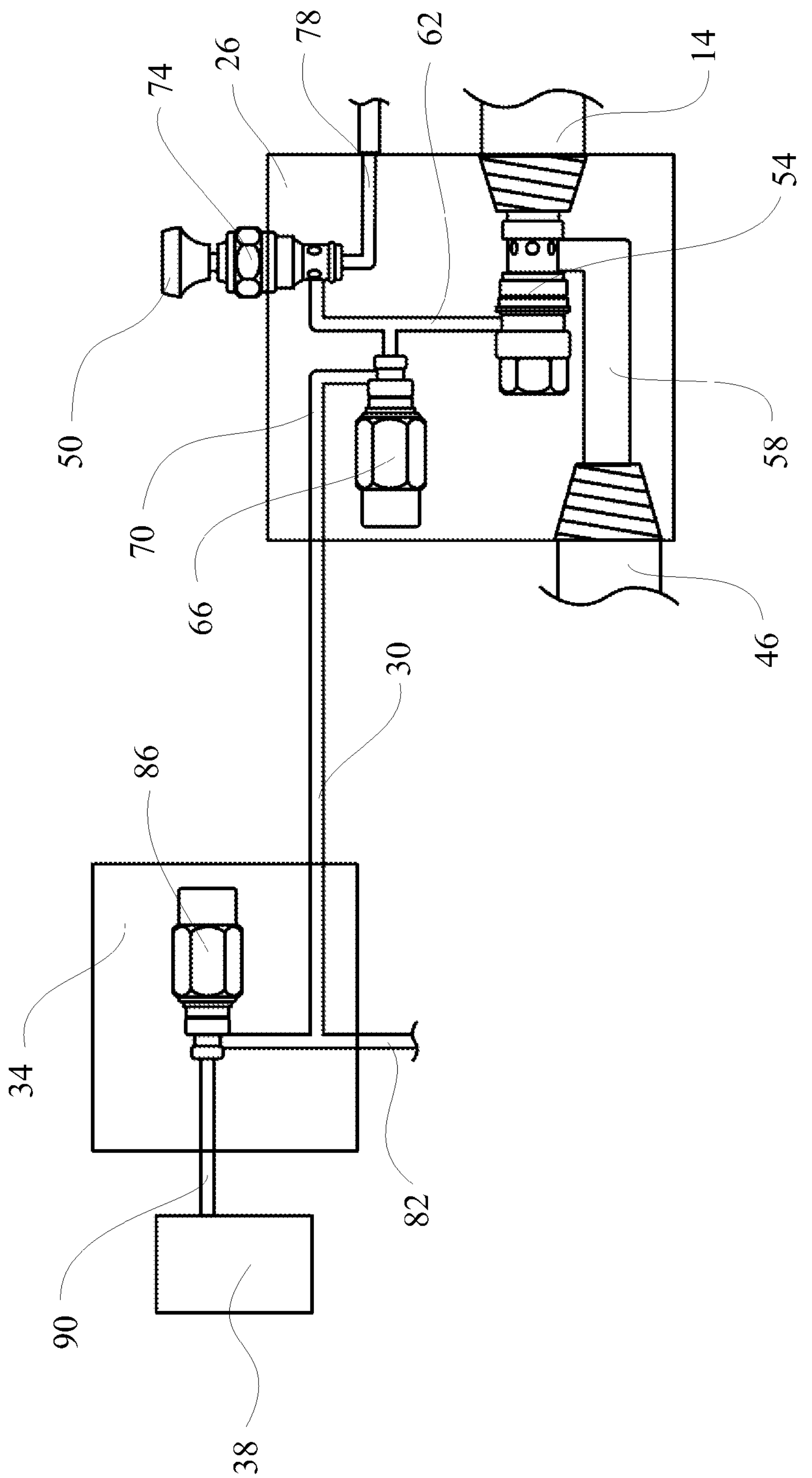
FIG. 7 shows a schematic view of the overpressure protection system of FIG. 1.

FIG. 7 shows a schematic diagram of the overpressure protection system including the overpressure protection valve 26 and the pressure relief valve 34. In the case of overpressure of the low pressure line 82 (i.e. an overpressure in the part of the hydraulic device 10 to which the low pressure line is connected), the pilot valve 66 opens and stops flow through the check valve 54. This happens almost instantly, preventing further pressure build in the device 10 and any sensitive system low pressure components. The pilot valve 86 typically opens to vent hydraulic fluid to the tank 38 and thereby lower the system pressure to below the predetermined protection pressure. Because hydraulic fluid has a low compressibility, typically about a teaspoon of hydraulic is vented to the tank 38. Because closing pilot valve 66 does not relieve pressure in passage 62, the check valve 54 remains closed. A worker must then manually open the poppet valve 74 to relieve passage 62 and open check valve 54. Before doing so, the worker will preferably turn off the hydraulic source (i.e. the power take off) and determine why an overpressure situation has occurred.

The present overpressure protection system is advantageous as it is simple and may be easily retrofitted to most hydraulically driven systems and equipment. It has been successful in preventing damage to low pressure hydraulic components and the resultant spills of hydraulic fluid. It is thus quite beneficial as it prevents system damage and down time, costly repairs, and the problems associated with large amounts of spilled hydraulic fluids.

There is thus disclosed an improved overpressure protection system. It will be appreciated that numerous changes may be made to the present invention without departing from the scope of the claims.

What is claimed is:

1. An overpressure protection system for a hydraulic system comprising:

an overpressure protection valve comprising:

a pilot operated check valve disposed upstream from a hydraulically driven tool, the pilot operated check valve having an inlet connected to a high pressure hydraulic supply line and an outlet connected to the hydraulically driven tool, hydraulic fluid flowing through the check valve to operate said hydraulically driven tool;

a pressure sense line connected to a low pressure portion of said hydraulic system which is downstream from the hydraulically driven tool;

a first hydraulically operated pilot valve having an inlet connected to the pressure sense line and an outlet connected to a pilot inlet on the check valve via a hydraulic passage; and a manually operated valve which is opened to vent fluid there through and relieve pressure in said hydraulic passage.

2. The system of claim 1, wherein the first hydraulically operated pilot valve opens at a predetermined pressure so as to allow hydraulic fluid to flow therethrough, apply pressure to the pilot operated check valve and thereby close the pilot operated check valve.

3. The system of claim 1, wherein the pilot operated check valve stops flow of hydraulic fluid to the hydraulic system if pressure in said low pressure part of the hydraulic system exceeds a predetermined pressure.

4. The system of claim 2, wherein, after fluid flow through the first hydraulically operated pilot valve, said hydraulic passage remains pressurized and prevents fluid flow through the pilot operated check valve until pressure in the hydraulic passage is manually relieved by opening the manually operated valve to vent fluid through the manually operated valve.

5. The system of claim 1, wherein the overpressure protection system is contained internally within a single manifold body.

6. The system of claim 1, wherein the overpressure protection valve consists essentially of the pilot operated check valve, the pressure sense line, the first pilot valve, and the hydraulic passage.

7. The system of claim 1, further comprising a pressure relief valve comprising:

a second hydraulically operated pilot valve having an inlet connected to the low pressure portion and an outlet connected to an outlet passage to remove hydraulic fluid from the hydraulic system.

8. The system of claim 7, wherein the second hydraulically operated pilot valve opens at a pressure which is equal to or greater than a pressure at which the first hydraulically operated pilot valve opens.

9. The system of claim 7, wherein the second hydraulically operated pilot valve opens after the first hydraulically operated pilot valve has opened.

10. An overpressure protection system for a hydraulically driven device comprising:

an overpressure protection valve having:

a fluid inlet attached to a high pressure hydraulic source;

a fluid outlet attached to a hydraulically driven tool which is driven by said high pressure hydraulic source;

a check valve disposed between the fluid inlet and the fluid outlet to selectively prevent and allow flow therebetween, wherein the check valve is disposed upstream of the hydraulically driven tool;

a pressure sense line connected to a low pressure hydraulic circuit disposed downstream of said hydraulically driven tool wherein the pressure sense line is connected to the check valve such that when pressure in said low pressure hydraulic circuit exceeds a predetermined threshold the check valve is closed and flow is prevented between the fluid inlet and the fluid outlet.

11. The system of claim 10, wherein the pressure sense line is connected to a first pilot valve and the first pilot valve is connected to the check valve via a hydraulic passage, and wherein when pressure in said pressure sense line exceeds a predetermined pressure the first pilot valve opens and allows fluid flow through the hydraulic passage and thereby closes the check valve.

12. The system of claim 11, wherein the hydraulic passage remains pressurized and the check valve remains closed until a manually operated valve is opened to relieve pressure in the hydraulic passage.

13. The system of claim 10, wherein the pressure sense line is connected to a low pressure hydraulic circuit of said machine adjacent a hydraulic fluid cooler.

14. The system of claim 10, further comprising a hydraulic machine, the machine comprising a fluid inlet for receiving high pressure hydraulic fluid, a machine operated by said hydraulic fluid, and a fluid outlet, wherein the overpressure protection valve is connected to the machine fluid inlet, and the pressure sense line is connected to the fluid outlet.

15. The system of claim 11, wherein the overpressure protection valve is contained within a single valve body.

16. The system of claim 11, further comprising a pressure relief valve comprising:

a second pilot valve having an inlet and an outlet;

an inlet line connected to the pressure sense line and to the second pilot valve inlet;

an outlet line connected to the second pilot valve outlet; and wherein, when pressure exceeds a predetermined threshold, the second pilot valve opens to vent hydraulic fluid from the hydraulic machine.

17. The system of claim 16, wherein the second pilot valve opens at a pressure which is equal to or slightly higher than a pressure at which the first pilot valve opens.

18. The system of claim 16, wherein the first pilot valve opens to close flow to the hydraulically actuated valve and the second pilot valve opens afterwards to relieve pressure in the pressure sense line.

19. The system of claim 11, further comprising a manually operated valve which must be opened to vent fluid from the hydraulic passage and thereby relieve pressure in the hydraulic passage to open the hydraulically operated valve.

* * * * *